US009811571B2

United States Patent
Kaufmann et al.

(10) Patent No.: US 9,811,571 B2
(45) Date of Patent: Nov. 7, 2017

(54) BITEMPORAL TIMELINE INDEX

(71) Applicants: Martin Kaufmann, Zurich (CH); Anil Kumar Goel, Ontario (CA); Chang Ge, Ontario (CA); Donald Kossmann, Zurich (CH)

(72) Inventors: Martin Kaufmann, Zurich (CH); Anil Kumar Goel, Ontario (CA); Chang Ge, Ontario (CA); Donald Kossmann, Zurich (CH)

(73) Assignee: SAP SE, Waldorf (DE)

( * ) Notice: Subject to any disclaimer, the term of this patent is extended or adjusted under 35 U.S.C. 154(b) by 442 days.

(21) Appl. No.: 14/106,621

(22) Filed: Dec. 13, 2013

(65) Prior Publication Data
US 2015/0169697 A1 Jun. 18, 2015

(51) Int. Cl.
*G06F 17/30* (2006.01)
(52) U.S. Cl.
CPC .. *G06F 17/30551* (2013.01); *G06F 17/30353* (2013.01); *G06F 17/30336* (2013.01); *G06F 17/30339* (2013.01)
(58) Field of Classification Search
CPC .......... G06F 17/30336; G06F 17/3002; G06F 17/30339; G06F 17/30345; G06F 17/30353; G06F 17/30474

USPC .......... 707/722, 715, 769, 802, 803
See application file for complete search history.

(56) References Cited

U.S. PATENT DOCUMENTS

| | | | |
|---|---|---|---|
| 7,546,306 B2 * | 6/2009 | Faerber ............ | G06F 17/30442 |
| 7,836,037 B2 * | 11/2010 | Renkes ............ | G06F 17/30336 |
| | | | 707/705 |
| 2014/0279838 A1 * | 9/2014 | Tsirogiannis ..... | G06F 17/30917 |
| | | | 707/603 |

OTHER PUBLICATIONS

Kim et al., "On Effective Data Clustering in Bitemporal Databases", 1997 IEEE, pp. 54-61.*

(Continued)

*Primary Examiner* — Monica Pyo
(74) *Attorney, Agent, or Firm* — Mintz Levin Cohn Ferris Glovsky and Popeo, P.C.

(57) ABSTRACT

Data that includes a query of a temporal database is received from a remote application server. The query specifies at least one fact and a system time and an application time for the at least one fact. Thereafter, a bitemporal timeline index is accessed to identify data responsive to the query. The bitemporal timeline index includes a system time dimension and an application time dimension. Next, the identified data can be retrieved and provided to the remote application server. Related apparatus, systems, techniques and articles are also described.

13 Claims, 17 Drawing Sheets

(56) References Cited

OTHER PUBLICATIONS

Kaufmann et al., "TPC-BiH: A Benchmark for Bitemporal Databases", ResearchGate, Jul. 2013, 18 pages.*
Fischer et al., "TPC-BiH: A Benchmark for Bitemporal Databases", ResearchGate, Aug. 2013, 27 pages.*
Moro et al., "BI-Temporal Indexing", SpringerLink, Jul. 2009, 8 pages.*
Martin Kaufmann, "Storing and Processing Temporal Data in a Main Memory Column Store", 2013 VLDB, Aug. 2013, 6 pages.*
Kaufmann et al. "Comprehensive and Interactive Temporal Query Processing with SAP HANA." *Proceedings of the VLDB Endowment.* vol. 6. No. 12. (2013):1210-1213.
Kaufmann et al. "Timeline Index: A Unified Data Structure for Processing Queries on Temporal Data in SAP HANA." *Proceedings of the ACM SIGMOD International Conference on Management of Data. SIGMOD 2013.* New York, NY, USA, Jun. 22-27, 2013. *SIGMOD Conference.* ACM. Kenneth A. Ross et al. (2013):1173-1184.

* cited by examiner

| | Name | City | StartApp | EndApp | StartSys | EndSys |
|---|---|---|---|---|---|---|
| 1 | John | Smallville | 10 | ∞ | 100 | 102 |
| 2 | John | Smallville | 10 | 11 | 102 | ∞ |
| 3 | John | Largeville | 11 | ∞ | 102 | 105 |
| 4 | John | Largeville | 11 | 13 | 105 | ∞ |
| 5 | John | Costtown | 13 | 14 | 105 | ∞ |
| 6 | John | Largeville | 14 | ∞ | 105 | 106 |
| 7 | John | Largeville | 14 | 16 | 106 | ∞ |
| 8 | Max | Newtown | 14 | 30 | 109 | ∞ |

Application
Timeline Index
ST 111

| AppTime | Sum | |
|---|---|---|
| 1 | $50 | +$50 |
| 2 | $30 | -$50+$30 |
| 3 | $120 | -$30+$120 |
| 13 | | |
| 15 | $200 | +$80 |
| 15 | $110 | -$120+$30 |
| 16 | $80 | -$30 |

| AppTime | |
|---|---|
| 10 | +2 |
| 11 | -2 +9 |
| 12 | -9 +10 |
| 13 | |
| 14 | +8 |
| 15 | -10 +11 |
| 16 | -11 |

Temporal table

| | Name | City | | | | |
|---|---|---|---|---|---|---|
| 1 | John | Smallville | 50 | 10 | 100 | 102 |
| 2 | John | Smallville | 50 | 10 | 102 | ∞ |
| 3 | John | Largeville | 30 | 11 | 102 | 105 |
| 4 | John | Largeville | 30 | 11 | 105 | 110 |
| 5 | John | Costtown | 100 | 13 | 105 | 110 |
| 6 | John | Largeville | 30 | 14 | 105 | 106 |
| 7 | John | Largeville | 30 | 14 | 106 | 110 |
| 8 | Max | Newtown | 80 | 14 | 109 | ∞ |
| 9 | John | Largeville | 30 | 11 | 110 | ∞ |
| 10 | John | Newtown | 120 | 12 | 110 | ∞ |
| 11 | John | Largeville | 30 | 15 | 110 | ∞ |
| 12 | John | Largeville | 50 | 16 | 111 | ∞ |

FIG. 12

Application Timeline Index ST 111

| SysTime | | |
|---|---|---|
| 100 | $50 | +$50 |
| 102 | $30 | -$50+$30 |
| 105 | $30 | -$30+$30 |
| 106 | $110 | -$30+$30+$80 |
| 109 | $190 | +$80 |
| 110 | $110 | -$30+$120 |

| SysTime | Events |
|---|---|
| 100 | +1 |
| 102 | -1+3 |
| 105 | +6-3 |
| 106 | -6+7+8 |
| 109 | +8 |
| 110 | -7+10 |

Temporal table

| | Người | Thành phố | Balance | StartTime | EndTime | SysStart | SysEnd |
|---|---|---|---|---|---|---|---|
| 1 | John | Smallville | 50 | 10 | ∞ | 100 | 102 |
| 2 | John | Smallville | 50 | 10 | 11 | 102 | ∞ |
| 3 | John | Largeville | 30 | 11 | ∞ | 102 | 105 |
| 4 | John | Largeville | 30 | 11 | 13 | 105 | 110 |
| 5 | John | Costtown | 100 | 13 | 14 | 105 | 110 |
| 6 | John | Largeville | 30 | 14 | ∞ | 105 | 106 |
| 7 | John | Largeville | 30 | 14 | 16 | 106 | 110 |
| 8 | Max | Newtown | 80 | 14 | ∞ | 106 | ∞ |
| 9 | John | Largeville | 30 | 11 | 12 | 109 | ∞ |
| 10 | John | Newtown | 120 | 12 | 15 | 110 | ∞ |
| 11 | John | Largeville | 30 | 15 | 16 | 110 | ∞ |
| 12 | John | Largeville | 60 | 16 | 20 | 111 | ∞ |

BITEMPORAL TIMELINE INDEX

TECHNICAL FIELD

The subject matter described herein relates to a bitemporal timeline index for use in accessing data within a database stored in temporal tables.

BACKGROUND

A temporal database is database with a temporal data model that stores when a tuple has been valid (with respect to application time) or visible (with respect to system time). Application time refers to a time at which a fact is true in the real world. For example, validity of a contract, time of registration, and the like. System time refers to a time at which a fact was stored in a database.

SUMMARY

In one aspect, data that includes a query of a temporal database is received from a remote application server. The query specifies at least one fact and a system time and an application time for the at least one fact. Thereafter, a bitemporal timeline index is accessed to identify data responsive to the query. The bitemporal timeline index includes a system time dimension and an application time dimension. Next, the identified data can be retrieved and provided to the remote application server.

The bitemporal timeline index can include an application timeline index for each point in system time. The application timeline index can be built dynamically in response to receiving the query. The application timeline index can be dynamically built by: reverting back to a most recent checkpoint, scanning a system timeline index between the checkpoint and a point specified by the query, computing deltas for a most recent application timeline index based on the scanning, and constructing the application timeline index using the checkpoint and the computed deltas.

The bitemporal timeline index can include an application timeline index and a system timeline index. Updates to at least one of the application timeline index and the system timeline index can be stored in a delta store. The application timeline index can be dynamically generated for a point in time specified by the query by merging the application timeline index with the corresponding delta store. The query can include multiple time dimensions so that there is a corresponding timeline index for each time dimension.

Non-transitory computer program products (i.e., physically embodied computer program products, etc.) are also described that store instructions, which when executed one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter enables more rapid temporal data query response times while, at the same time, consuming fewer processing resources and using a smaller amount of memory.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a first diagram illustrating a temporal data table;

FIG. 12 is a diagram illustrating how an application timeline index can be used to compute aggregated values;

FIG. 15 is a diagram illustrating execution of a temporal aggregation query;

Like reference symbols in the various drawings indicate like elements.

DETAILED DESCRIPTION

Figure 1:
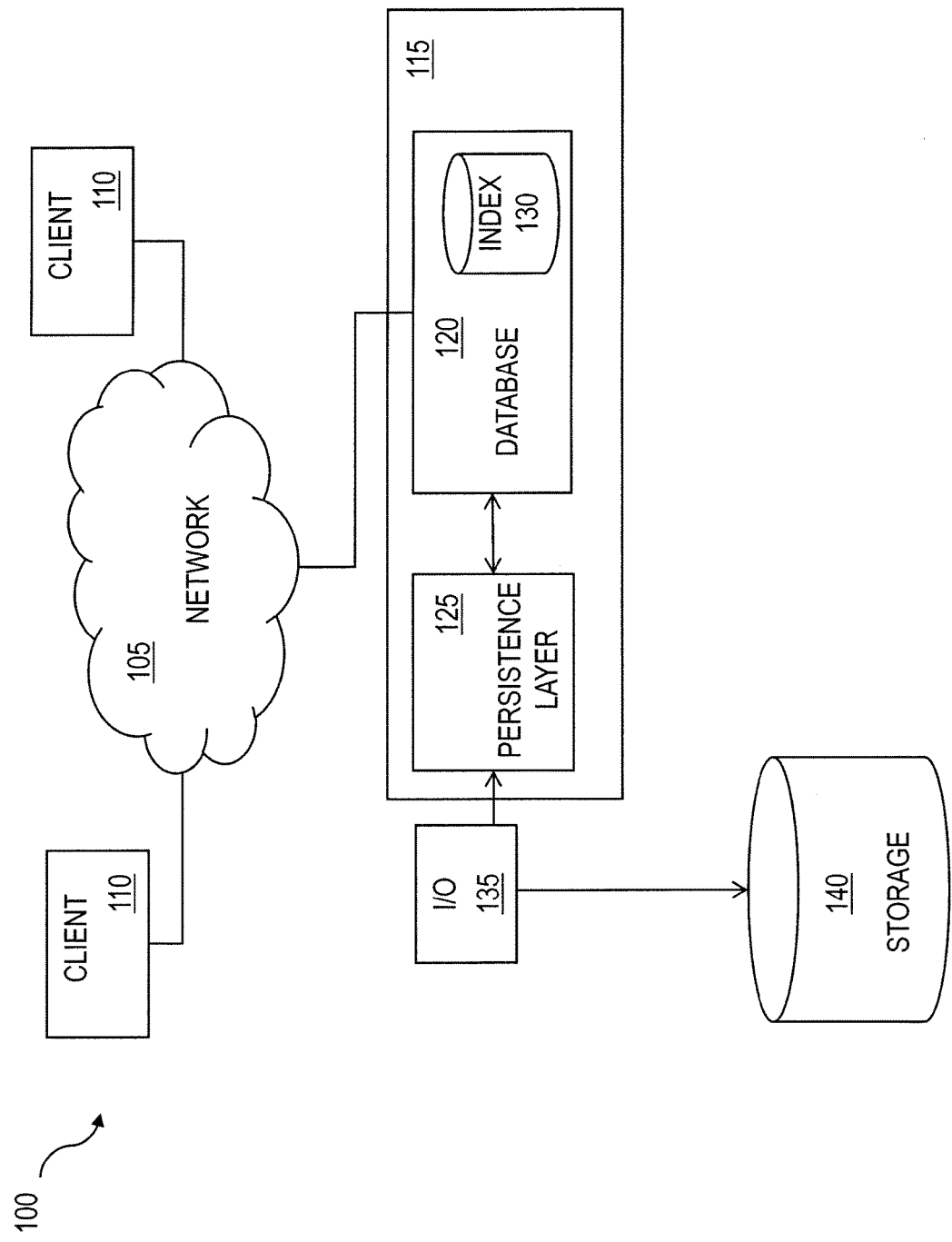
FIG. 1 is a system diagram illustrating a computing environment including a database having a bitemporal index.

FIG. 1 shows an example of a system 100 in which a computing system 115, which can include one or more programmable processors that can be collocated, linked over one or more networks, etc., executes one or more modules, software components, or the like of a database 120. The database 120 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 115 as well as to remote users accessing the computing system 115 from one or more client machines 110 over a network connection 105. One or more user interface screens produced by the one or more first modules can be displayed to a user, either via a local display or via a display associated with one of the client machines 110. Data units of the database 1120 can be transiently stored in a persistence layer 125 (e.g. a page buffer or other type of temporary persistency layer), which can write the data, in the form of storage pages, to one or more storages 140, for example via an input/output component 135. The one or more storages 140 can include one or more physical storage media or devices (e.g. hard disk drives, persistent flash memory, random access memory, optical media, magnetic media, and the like) configured for writing data for longer term storage. It should be noted that the storage 140 and the input/output component 135 can be included in the computing system 115 despite their being shown as external to the computing system 115 in FIG. 1.

Data retained at the longer term storage 140 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

The database 120 can be a bitemporal database and can include an index 130, which can in turn, be/include a bitemporal timeline index. Bitemporal in this regard refers to both system time and application time. System time is used to determine when a particular tuple been visible in the database. With an in-memory database (or other type of insert only databases), updates are implemented as an insert of a new version of a tuple. System time can be implemented via an append only arrangement (i.e., no delta indices are required). Append only can be exploited for a counting sort approach (i.e., an algorithm for sorting data in linear time for a limited range of integer values, etc.) for a timeline index as further described below. Application time refers to when a particular tuple has been visible in the real world. However, issues can arise because new tuples can be added, deleted and modified at any time (even in the past). Append only does not hold for application time, and as such, a standard timeline index cannot be used and, as such, a delta-main index approach can be used.

The bitemporal timeline index 130 can be based on a few assumptions. First, it can be assumed that application time and system time are not fully orthogonal. Further, application time cannot be changed without updating system time. In addition, application time and system time can be queried independently of each other in combination. Still further, it can be assumed that for, a query on application time executed on the current system time, a full symmetrical/two-dimensional index can be too expensive, and snapshots of application time indices may need to be maintained.

In order to index the bitemporal tables in the database 120, the bitemporal timeline index 130 can maintain an application timeline index per point in system time. There can be different approaches for implementing such an arrangement.

In one variation for an in-memory database 120 system, the application timeline index can be built dynamically with an index for system time being kept only in memory and the index for application time per system time only being constructed on demand. FIG. 2 is a diagram 200 of a temporal table 210 that illustrates how an index is dynamically built:

At System Time 109:
INSERT INTO people
(name, city, startapp, endapp)
VALUES ('Max', 'Newtown', 14, 30).

Figure 3:
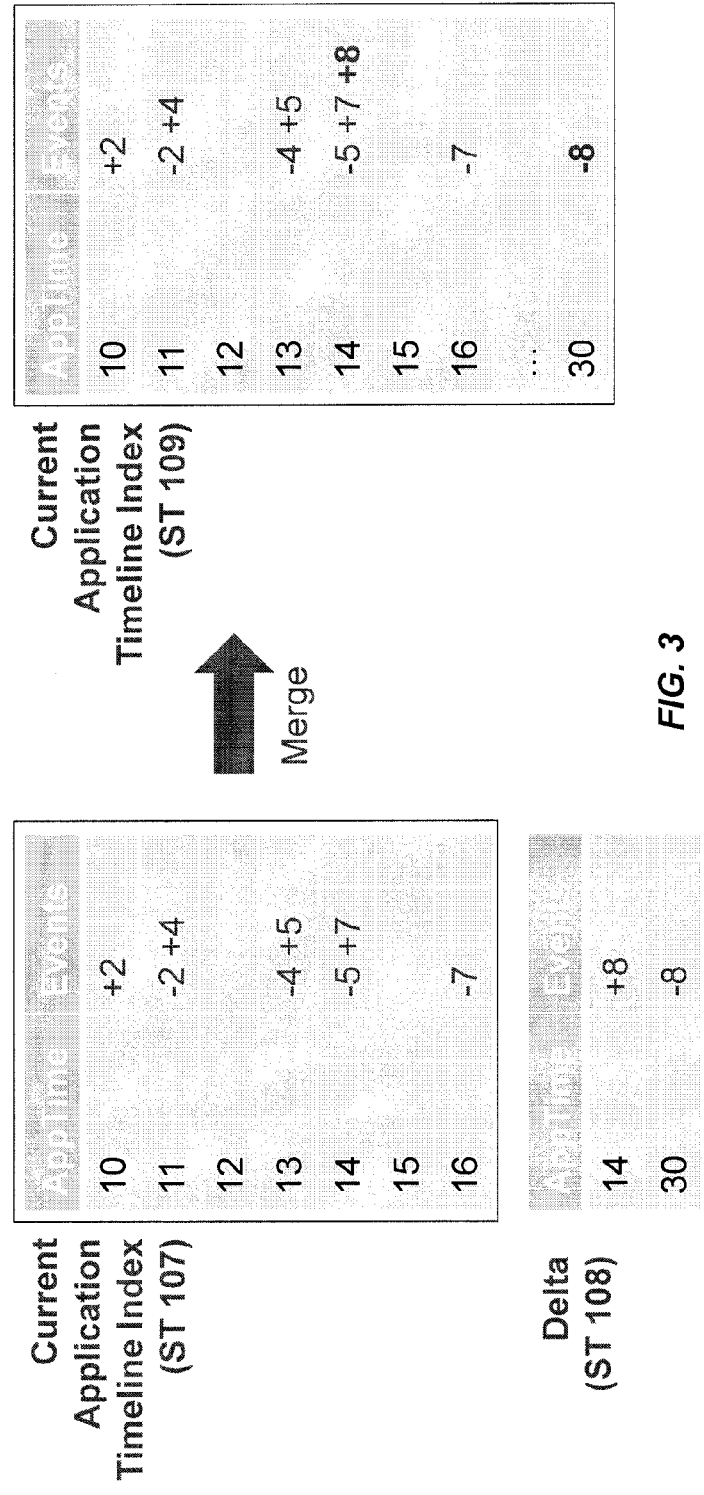
FIG. 3 is a diagram illustrating an application timeline index.

FIG. 3 is a diagram 300 that illustrates generation of an application timeline index in which checkpoints of application timeline indices are stored. With this arrangement, a delta store can be built dynamically and checkpoints need not be indexed. As part of a delta merge operation, the application timeline index at system time 107 can be merged with the delta (built at system time 108) to result in the application timeline index at system time 109. The following insert and update operations visualize the approach:

INSERT INTO people
(name, city, startapp, endapp)
VALUES ('Max', 'Newtown', 14, 30).

Figure 4:
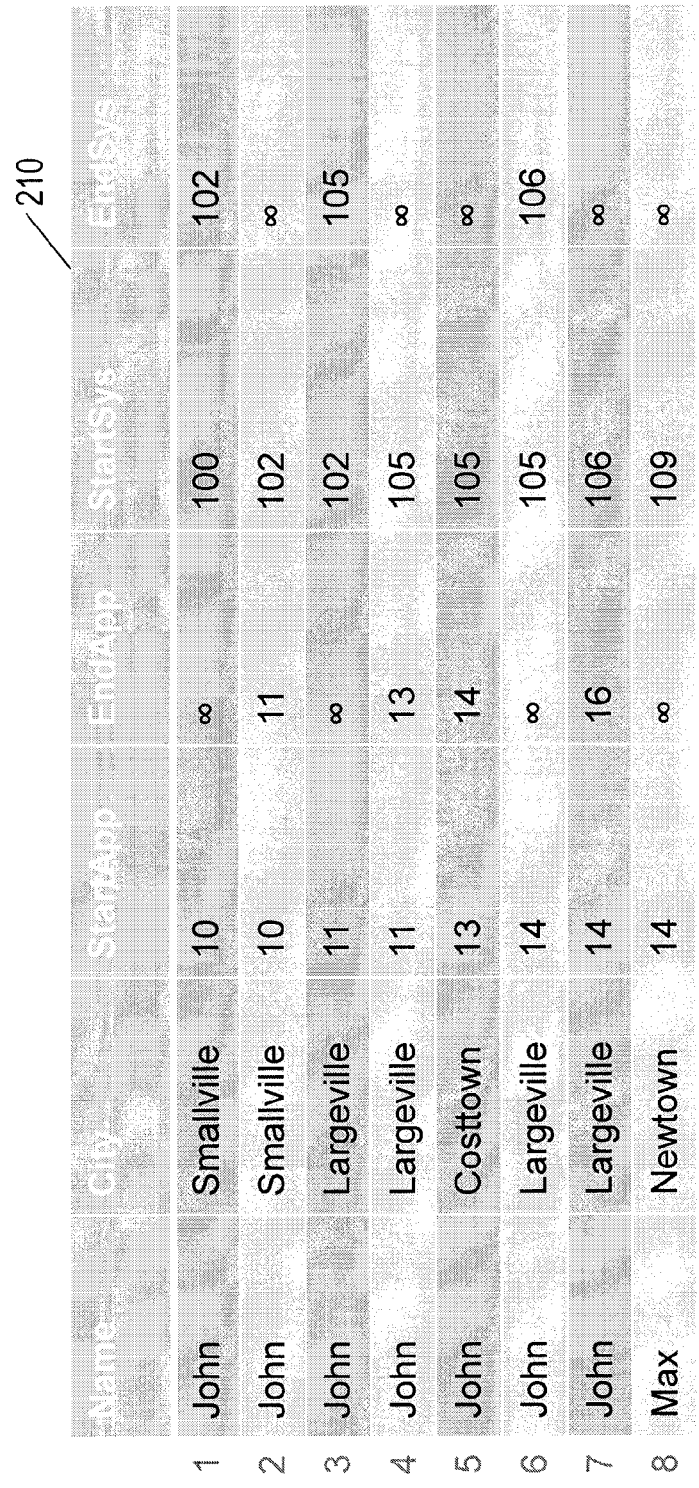
FIG. 4 is a second diagram illustrating a temporal data table.

FIG. 4 is a diagram 400 illustrating temporal table 210 as of system time 107. A subsequent operation can be:

At System Time 110:
UPDATE people
FOR PORTION OF BUSINESS_TIME FROM '12' TO '15'
SET city='Newtown' WHERE name='John'.

Figure 5:
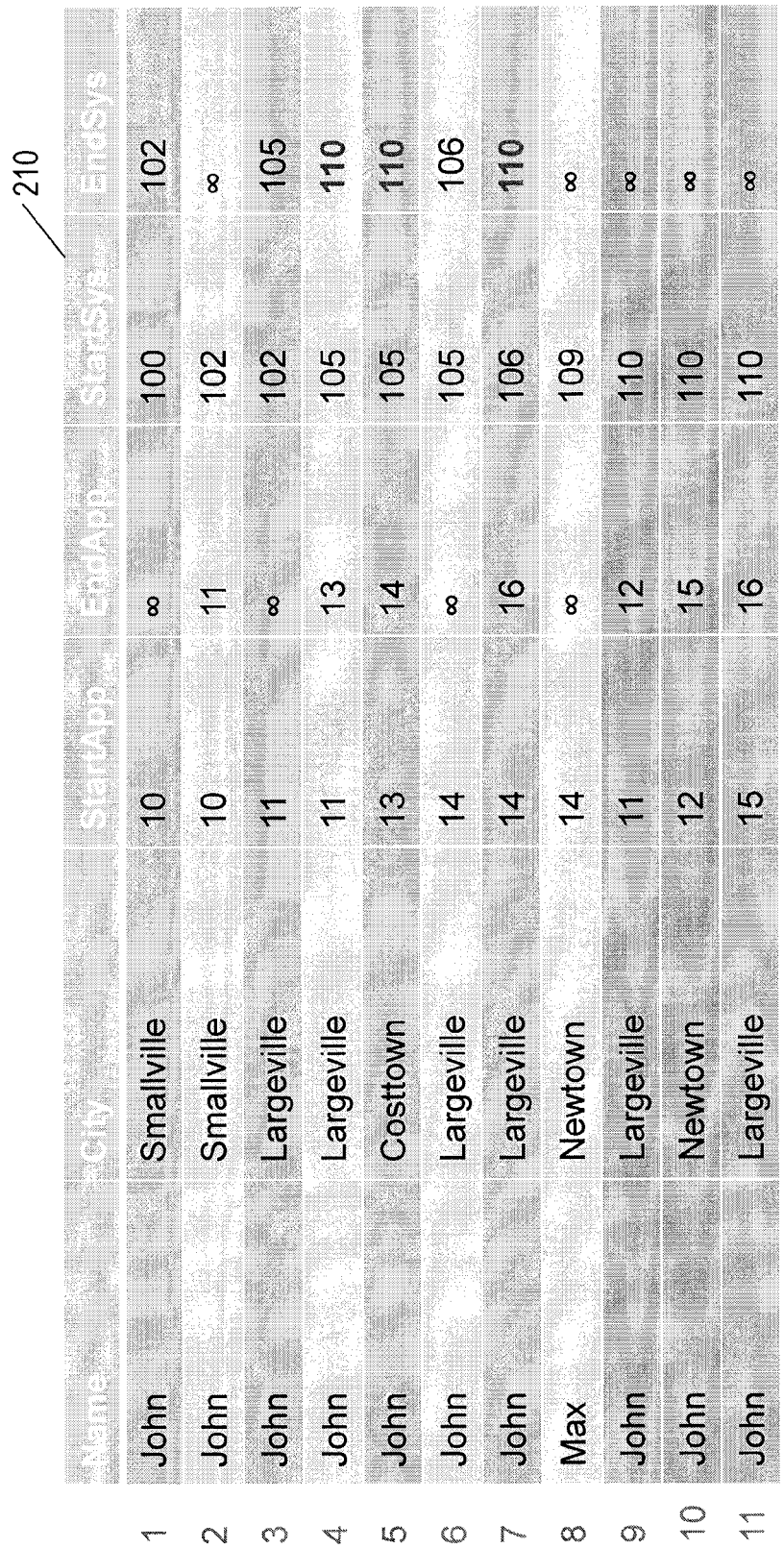
FIG. 5 is a third diagram illustrating a temporal data table.

FIG. 5 is a diagram 500 illustrating temporal table 210 as of system time 110. A subsequent operation can be:

At System Time 110:
UPDATE people
FOR PORTION OF BUSINESS_TIME FROM '12' TO '15'
SET city='Newtown' WHERE name='John'.

Figure 6:
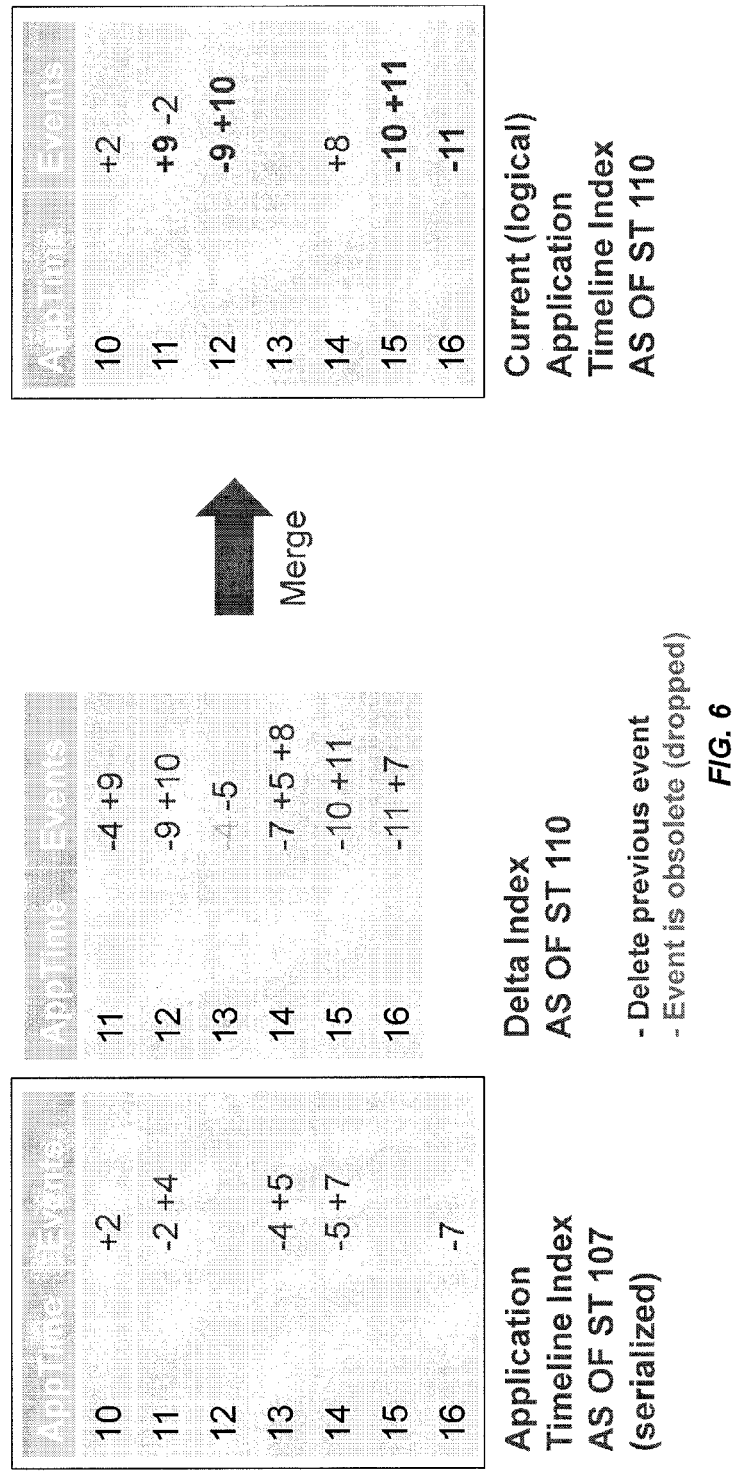
FIG. 6 is a diagram illustrating construction of an application timeline index after a delta merge.
Figure 7:
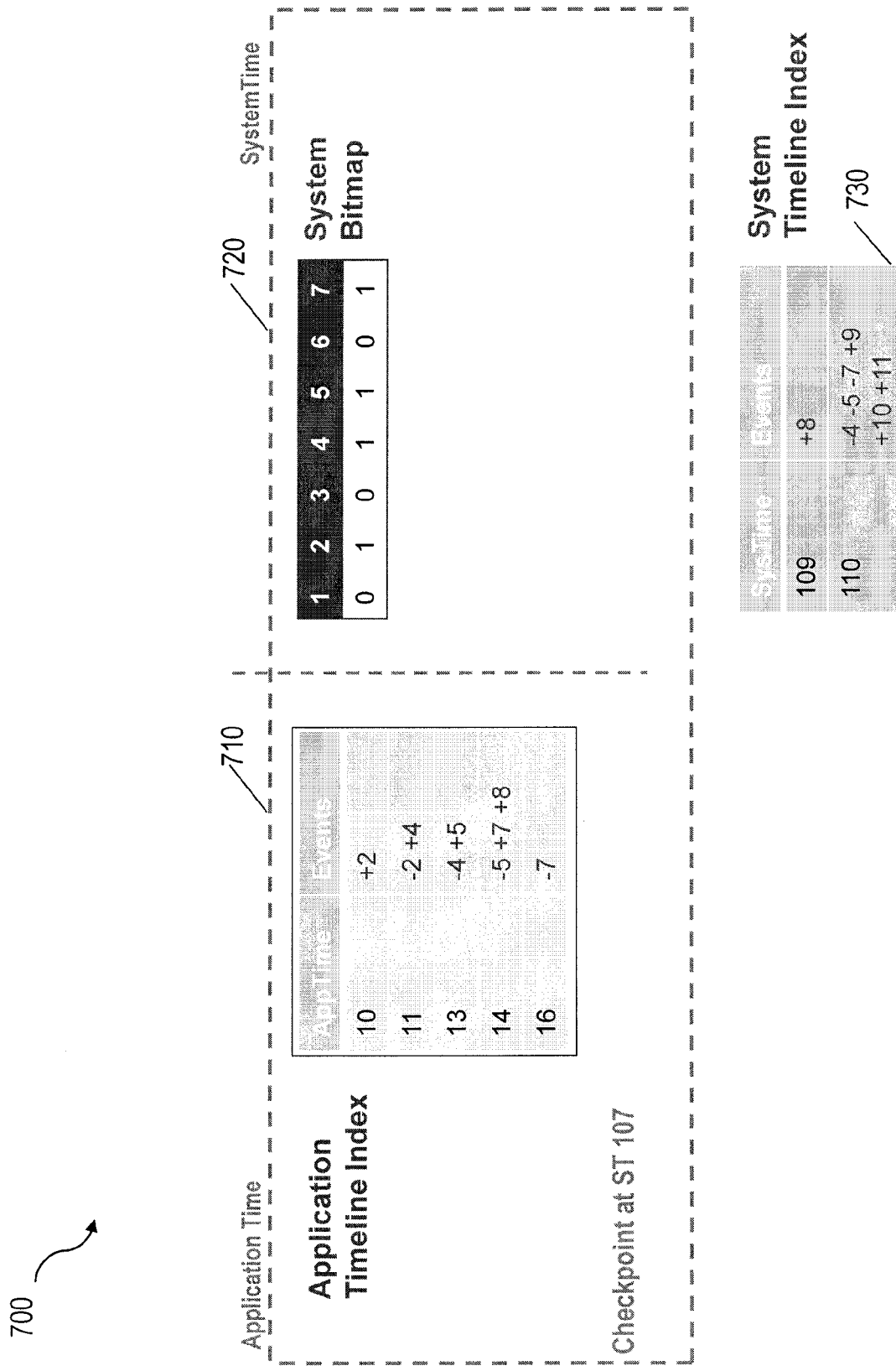
FIG. 7 is a diagram illustrating an application timeline index, a system bitmap, and a system timeline index.

FIG. 6 is a second diagram 600 showing a delta merge operation. In this case, the application timeline index at system time 107 is merged with the delta index as of system times 107-110 to result in the application timeline index at system time 110. The delta index shows previous events being deleted as well as obsolete events being dropped. A corresponding operation can include:

UPDATE people
FOR PORTION OF BUSINESS_TIME FROM '12' TO '15'
SET city='Newtown' WHERE name='John';

FIG. 7 is a diagram 700 illustrating how a bitemporal timeline index can be maintained. A starting point can be an empty table or checkpoint with an application timeline index 710 (at system time 107) and a corresponding system time bitmap 720. Updates to the temporal table result can be appended to the system timeline index 730.

The time a checkpoint is created can be defined by a checkpoint policy. The checkpoint policy can specify that the checkpoint is created, for example, after a defined time interval and/or after a defined number of updates. Each checkpoint can be computed for a given system time ST.

For each checkpoint a reference to the position ST in the system timeline index can be stored. In addition, for system time, a bitmap of all tuples visible in the table at time ST can be stored. Further, for application time, a delta can be computed, the delta can be applied to the previous checkpoint, and a new corresponding checkpoint can be saved.

Figure 8:
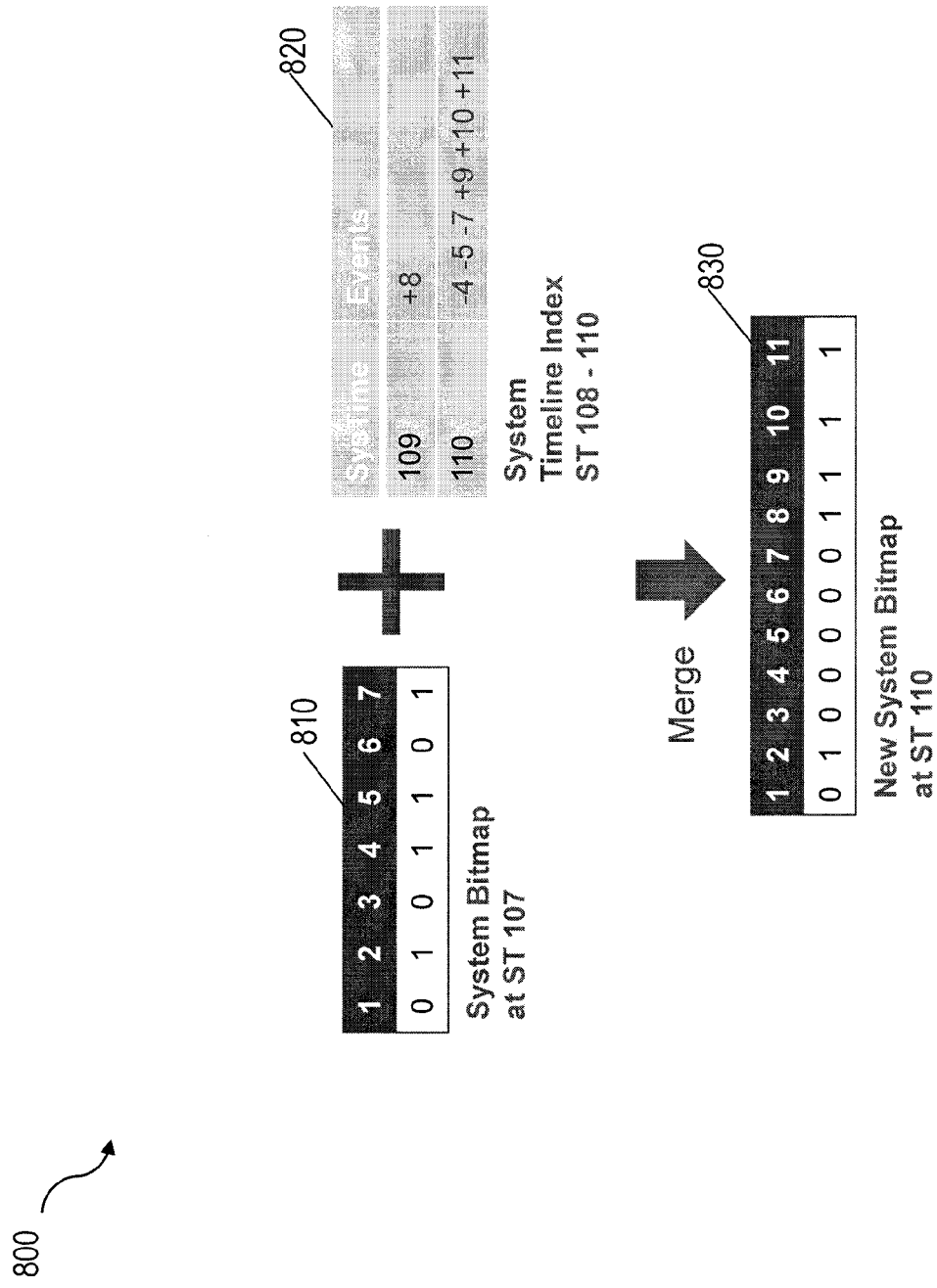
FIG. 8 is a diagram illustrating generating of a new system timeline bitmap from a previous bitmap and a system timeline index.

FIG. 8 is a diagram 800 illustrating how a checkpoint is computed for system time. At 810, a copy of a previous system bitmap is made. At 820, changes from the system timeline index can be applied, and a new corresponding checkpoint can, at 830, be saved.

Figure 9:
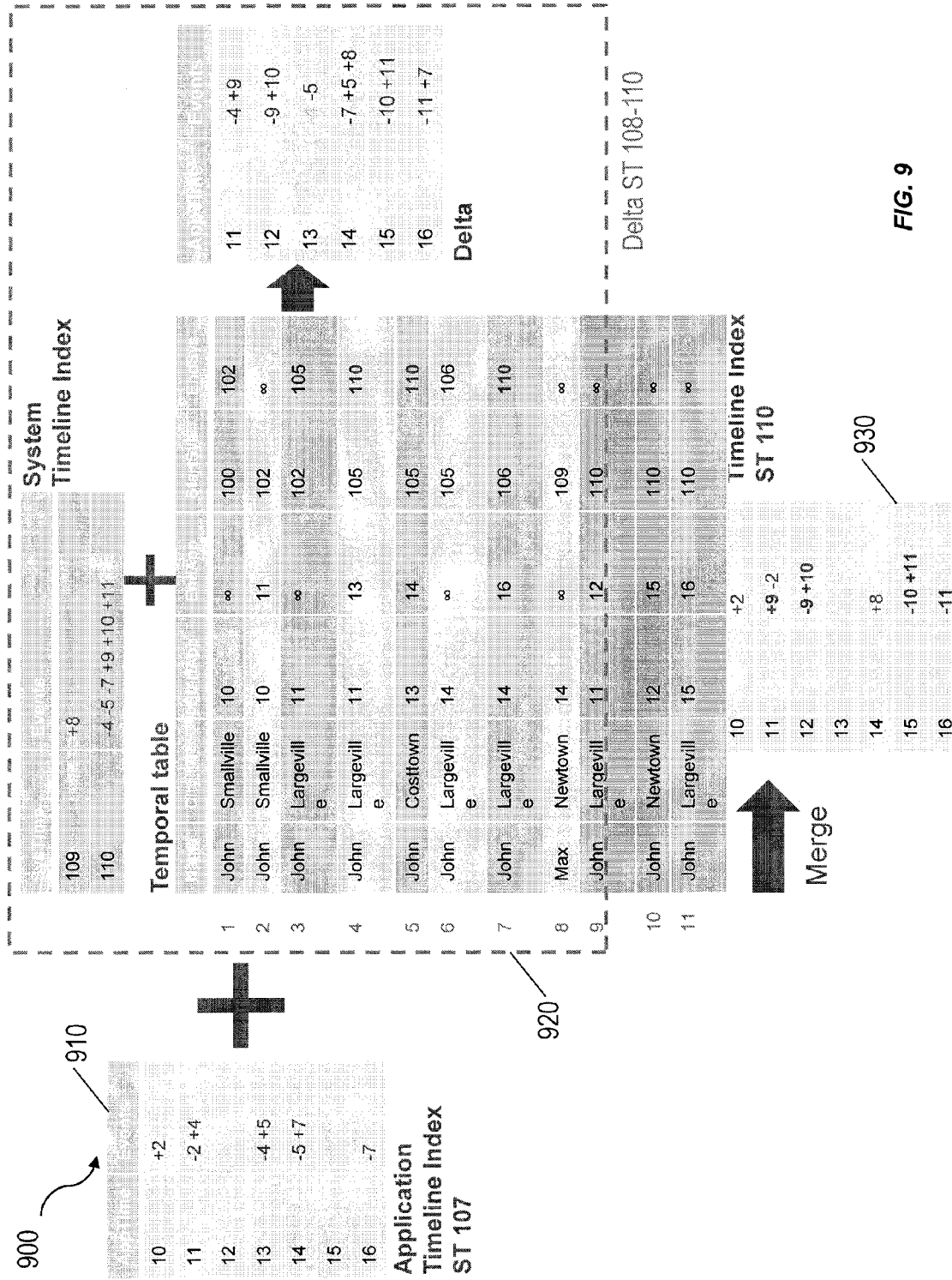
FIG. 9 is a diagram illustrating how an application timeline index can be computed that is valid for a certain point in system time.

FIG. 9 is a diagram 900 illustrating how an application timeline index can be computed that is valid for a certain point in system time. At 910, a copy of the application timeline index can be made. Thereafter, at 920, deltas can be computed using the system timeline index. A new application timeline index can then, at 930, be computed from the previous application timeline index and delta.

Figure 10:
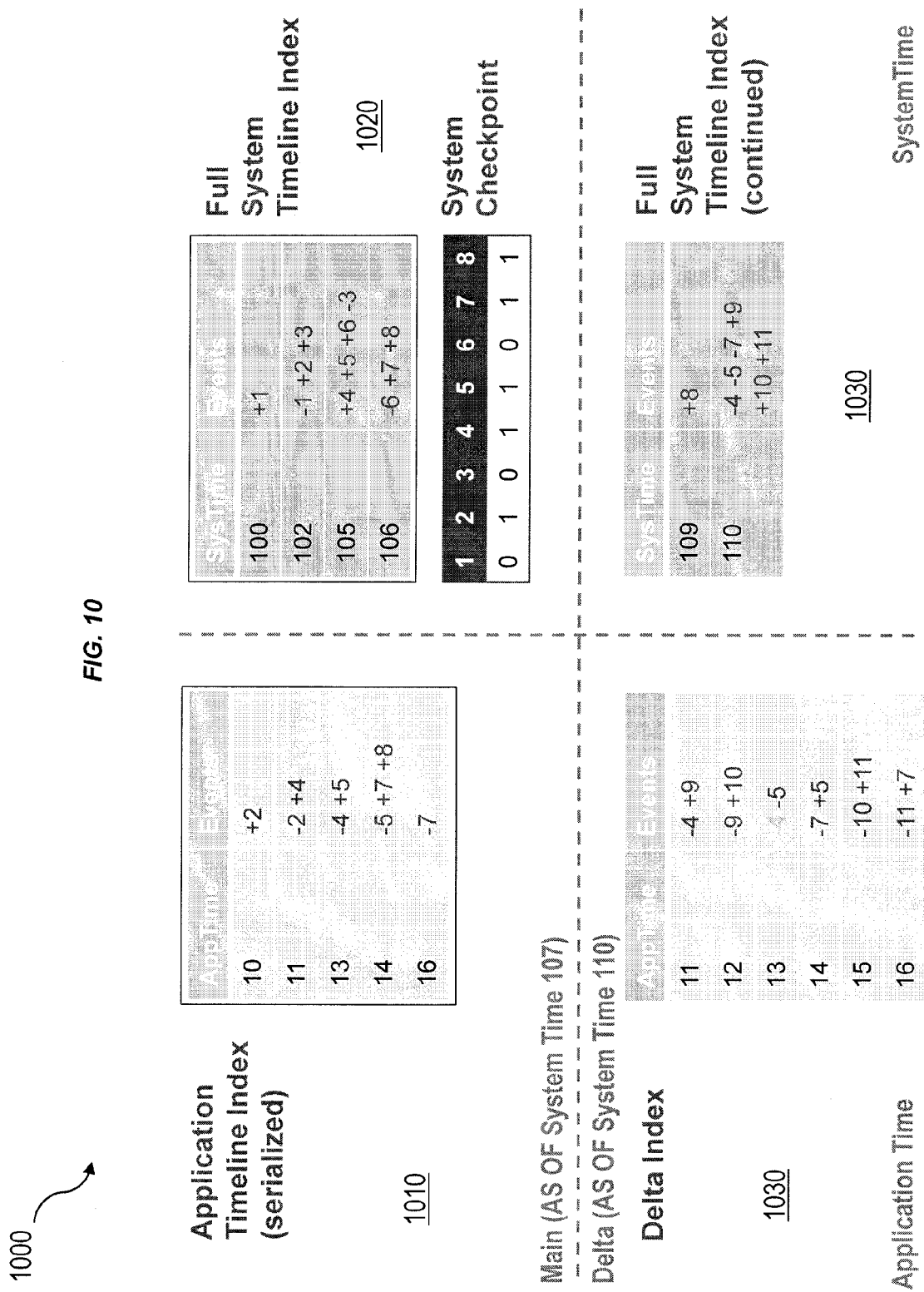
FIG. 10 is a diagram illustrating an application timeline index with corresponding delta as well as a system timeline index with corresponding delta.

FIG. 10 is a diagram 1000 illustrating an application timeline index 1010 with corresponding delta 1030 as well as a system timeline index 1020 with corresponding delta 1040. With such an arrangement, all changes can be appended to the corresponding delta 1030, 1040. Deltas can, in some variations, only be computed if required by a query. The deltas can later be dropped after the query is processed. In addition, the delta can be computed using the system timeline index 1020. The resulting logical index (i.e., the full index does not have to be serialized—the index can be computed by taking the last previous checkpoint and the delta) can then be used for subsequent queries. Such an arrangement can be advantageous in that concurrent transactions are permitted.

Other variations for index updates can also be implemented. In one variation, updates are written to the indices when they are made. With this arrangement, no delta index is required which results in optimal read performance. However, the process of updating can be expensive (with regard to consumption of processing resources and timing) and issues can arise with regard to concurrent transactions.

Indices can also be updated using a sorted delta index technique. In such an implementation, all updates are written to a sorted multidimensional mapping table (e.g., Multi-Map). Such an arrangement provides enhanced read performance, however, updates can be more expensive (from a resource point of view) due to sorting the deltas.

Indices can also be updated by rebuilding the deltas using the system timeline index. With this variation, only application index checkpoints are materialized (i.e., written to disk) while keeping reference to the corresponding system timeline index. In addition, the delta and logical application timeline indexes can be constructed using the system timeline index. Such an arrangement is advantageous in that no/little overhead (e.g., processing resources, etc.) are required for updates; however, read operations are more expensive because the delta needs to be dynamically reconstructed.

With the system timeline index, the index can be kept up to date by appending events with update operations. This arrangement exploits the fact that previous versions never change in system time. With the application timeline index, an index need not be maintained for each update. Application timeline indices can be only created for the checkpoints.

The bitemporal timeline index 130 can support queries that contain multiple time dimensions. One timeline index can be used per time dimensions. In addition, the bitemporal timeline index 130 can supports multiple temporal operators such as temporal aggregation, temporal joins, time travel, and the like.

In a first example of a bitemporal query, in system time, a time travel operation (i.e., point in time operation) is initiated, and in application time, a temporal aggregation (i.e., range operation) is initiated. The bitemporal query can be stated as: "What was the sum of all balances for each Application Time known at System Time $V_S$=110?". The query can be formulated as:

SELECT SUM(balance)
FROM PEOPLE p
AS OF SYSTEM TIME 110
GROUP BY p.app_time( )

Figure 11:
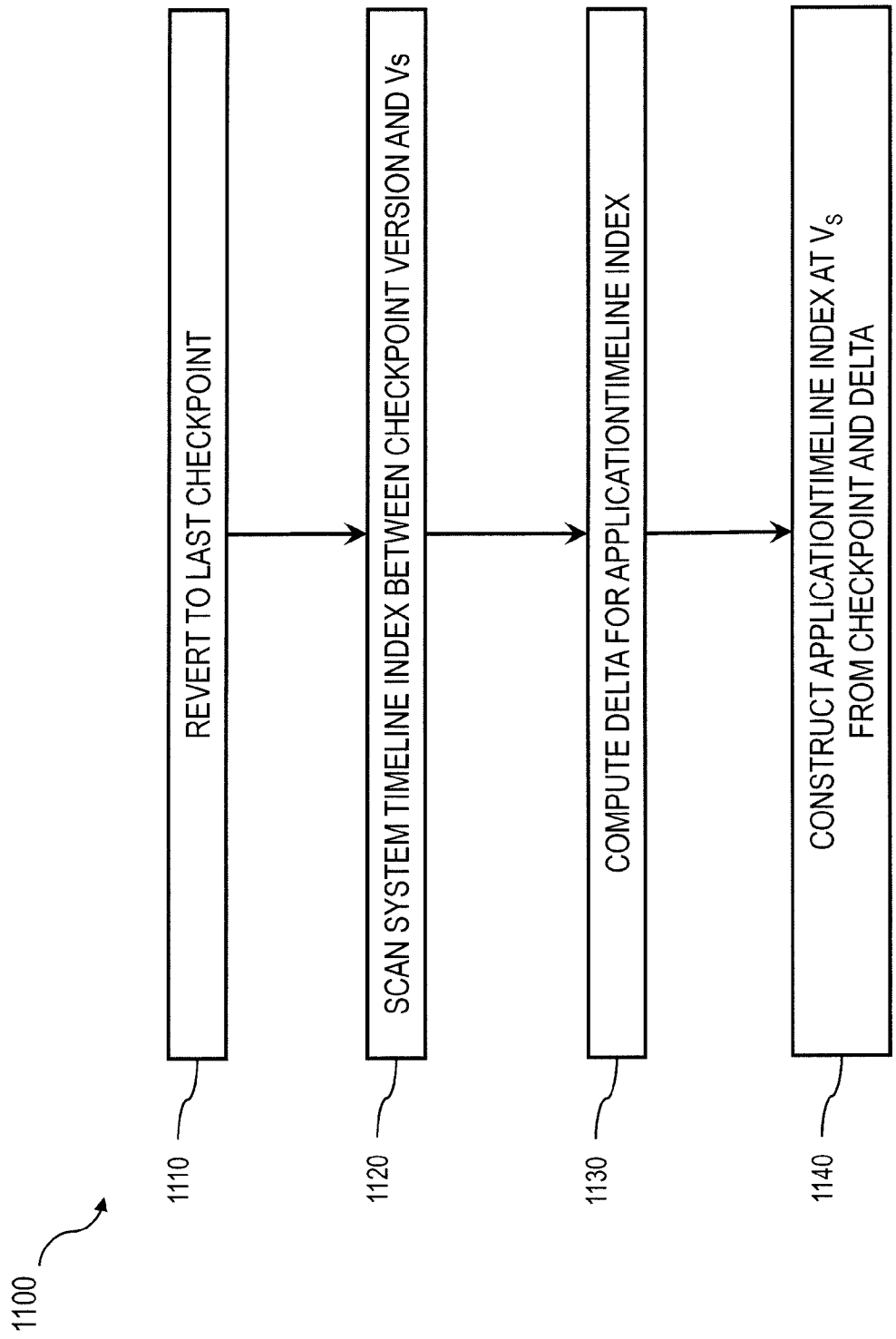
FIG. 11 is a process flow diagram illustrating construction of an application timeline index.

With reference to diagram 1100 of FIG. 11, a corresponding query plan can be generated by first constructing an application timeline index as of system time 110. First, at 1110, it can be reverted back to the last previous checkpoint. Subsequently, at 1120, the system timeline index can be scanned between the last previous checkpoint and $V_S$. Next, at 1130, the delta for the application timeline index can be computed so that the application timeline index $V_S$ can be constructed, at 1140, from the last previous checkpoint and the computed delta.

FIG. 12 is a diagram 1200 that illustrates how an application timeline index can be used to compute aggregated values. In particular, the temporal aggregation "sum of all balances at each point in application time as of system time 111" can be computed.

In a second example of a bitemporal query, in system time, a current version operation (i.e., point in time operation) is initiated, and in application time, a time travel operation (i.e., point in time operation) is initiated. The bitemporal query can be stated as: "What was the sum of all balances at Application Time 14?" The query can be formulated as:

SELECT SUM(balance)
FROM PEOPLE p
AS OF BUSINESS TIME 14

Figure 13:
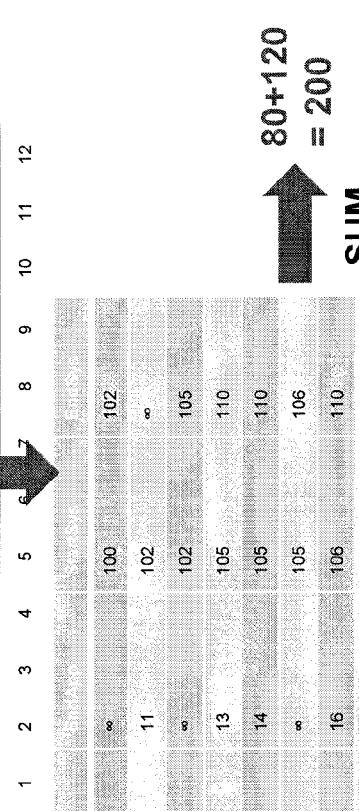
FIG. 13 is a diagram illustrating execution of a time travel query for only system time.

The corresponding query plan can be generated by constructing an application timeline index as of current system time 111. The application timeline indices can then be applied to application time travel. FIG. 13 is a diagram 1300 illustrating a time travel query as follows: "which tuples have been visible at system time 110 and application time 14". The application timeline index can be created at system time 110 and subsequently used to compute a time travel for application time 14. Next, the sum of the balances for the visible tuples can then be computed.

In a third example of a bitemporal query, in system time, a temporal aggregation operation (i.e., range operation) is initiated, and in application time, a time travel operation (i.e., point in time operation) is initiated. The bitemporal query can be stated as: "What was the sum of all balances for each System Time valid for Application Time $V_A$=14". The query can be formulated as:

SELECT SUM(balance)
FROM PEOPLE p
AS OF BUSINESS TIME 12
GROUP BY p.sys_time( )

Figure 14:
FIG. 14 is a diagram illustrating execution of a time travel query for both system time and for application time.

With reference to diagrams 1400, 1500 of FIGS. 14-15, the corresponding query plan can be generated by accessing an existing system timeline index. Subsequently, for each event, check if StartApp<=$V_A$<EndApp. Here: $V_A$=14. In this example, only tuples that are valid at application time 14 are of interest. Therefore, the events in the timeline index can be filtered and a new timeline index can be created containing only tuples which are valid at application time 14. Next, the system timeline index can be applied to compute aggregated values.

Figure 16:
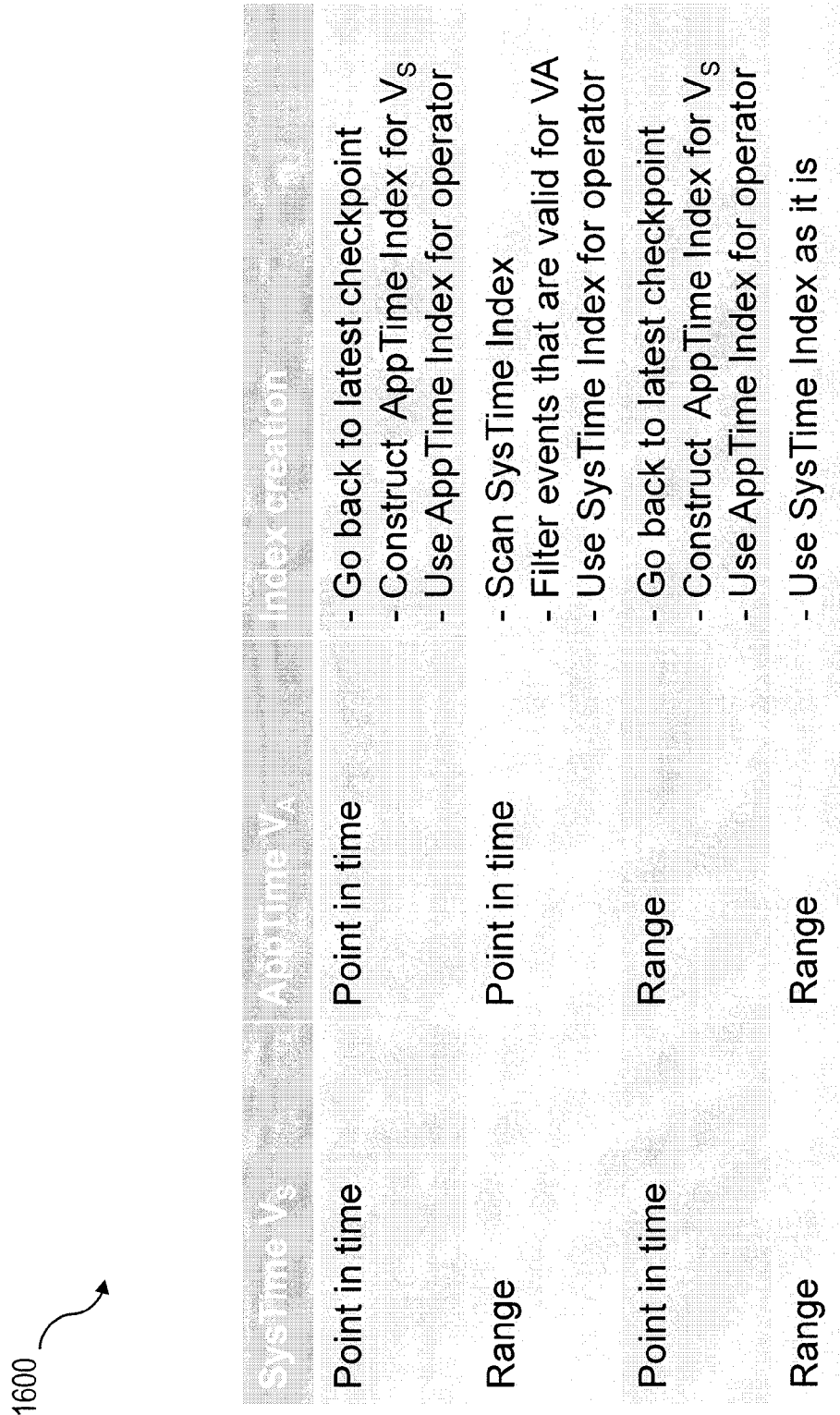
FIG. 16 is a diagram including a table showing how various queries are handled.

FIG. 16 is a diagram 1600 that illustrates how to retrieve an appropriate timeline index for a query. As noted above, there are two time dimensions: system time and application time. In each dimension, select either a point or a range (aggregation). Thereafter, the diagram 1600 in FIG. 16, shows how an index can be computed in each case.

Figure 17:
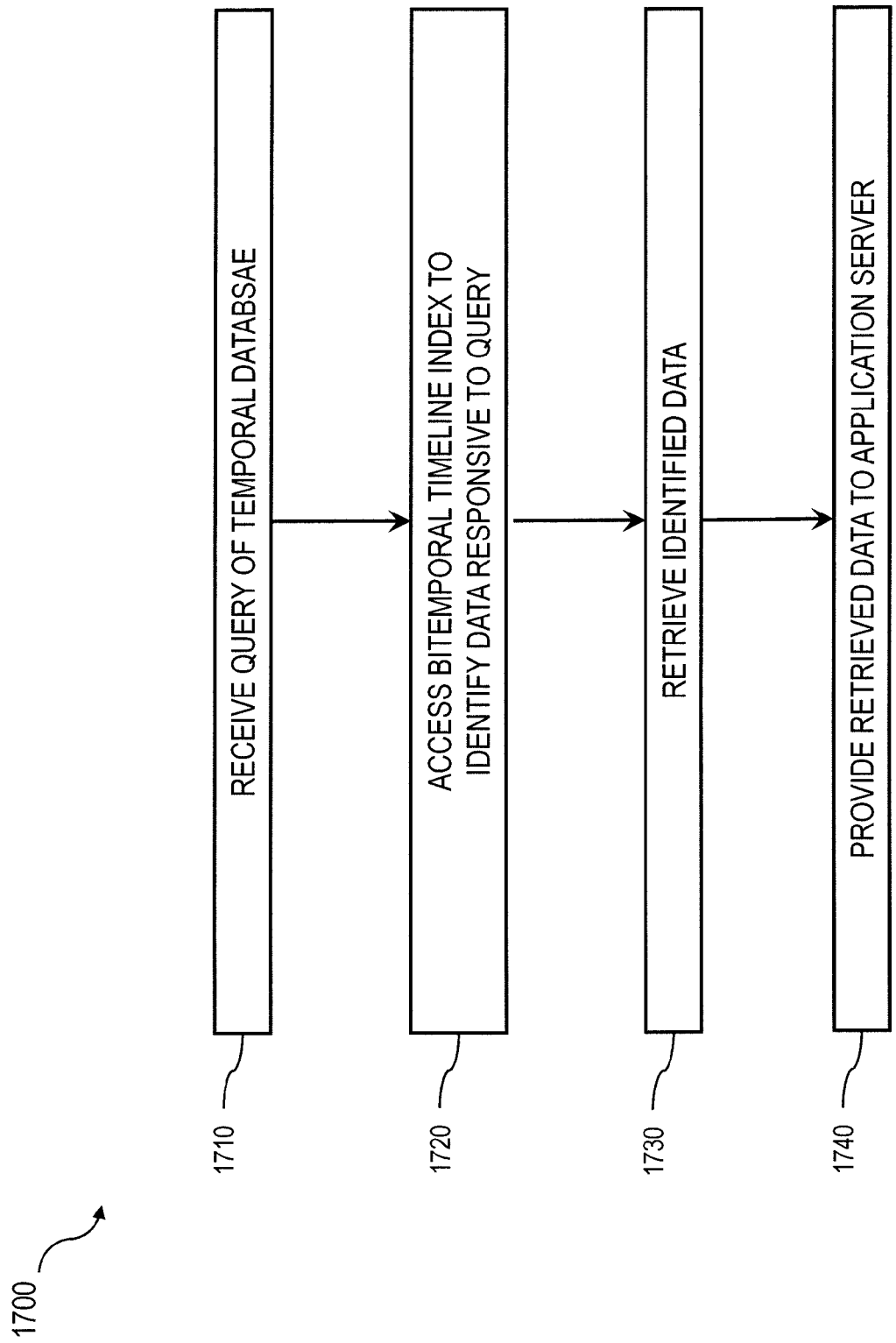
FIG. 17 is a process flow diagram illustrating handling of a temporal query using a bitemporal timeline index.

FIG. 17 is a process flow diagram 1700 in which, at 1710 data comprising a query of a temporal database is received from a remote application server. The query specifies at least one fact and a system time and an application time for the at least one fact. Subsequently, at 1720, a bitemporal timeline index is accessed to identify data responsive to the query. The bitemporal timeline index can include a system time dimension and an application time dimension. The retrieved data is then, at 1730, retrieved. The retrieved data, in turn, is provided, at 1740, to the remote application server.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
    receiving, from a remote application server, data comprising a query of a temporal database, the query specifying at least one fact and a system time and an application time for the at least one fact;
    accessing a bitemporal timeline index to identify data responsive to the query, the bitemporal timeline index comprising:
        a system timeline index comprising a system time dimension, the system time dimension comprising a system time that indicates when a data object is visible in the temporal database; and
        an application timeline index comprising an application time dimension, the application time dimension comprising an application time that indicates when the data object is visible to a user;
    storing updates to at least one of the application timeline index and the system timeline index in a delta store;
    dynamically generating the application timeline index for a point in time specified by the query by merging the application timeline index with the corresponding delta store;
    retrieving the identified data; and
    providing the retrieved data to a remote application server.

2. A method as in claim 1, wherein the bitemporal timeline index comprises an application timeline index for each point in system time.

3. A method as in claim 2, wherein the application timeline index is built dynamically in response to receiving the query.

4. A method as in claim 3, wherein the application timeline index is dynamically built by:
- reverting back to a most recent checkpoint;
- scanning a system timeline index between the checkpoint and a point specified by the query;
- computing deltas for a most recent application timeline index based on the scanning; and
- constructing the application timeline index using the checkpoint and the computed deltas.

5. A method as in claim 1, wherein the query comprises a multiple time dimensions, and wherein there is a corresponding timeline index for each time dimension.

6. A method as in claim 1, wherein the receiving, accessing, retrieving, and providing are implemented by at least one data processor forming part of at least one computing system.

7. A non-transitory computer program product storing instructions which, when executed by at least one data processor forming part of at least one computing system, results in operations comprising:
- receiving, from a remote application server, data comprising a query of a temporal database, the query specifying at least one fact and a system time and an application time for the at least one fact;
- accessing a bitemporal timeline index to identify data responsive to the query, the bitemporal timeline index comprising:
  - a system timeline index comprising a system time dimension, the system time dimension comprising a system time that indicates when a data object is visible in the temporal database; and
  - an application timeline index comprising an application time dimension, the application time dimension comprising an application time that indicates when the data object is visible to a user;
- storing updates to at least one of the application timeline index and the system timeline index in a delta store;
- dynamically generating the application timeline index for a point in time specified by the query by merging the application timeline index with the corresponding delta store;
- retrieving the identified data; and
- providing the retrieved data to a remote application server.

8. A computer program product as in claim 7, wherein the bitemporal timeline index comprises an application timeline index for each point in system time.

9. A computer program product as in claim 8, wherein the application timeline index is built dynamically in response to receiving the query.

10. A computer program product as in claim 9, wherein the application timeline index is dynamically built by:
- reverting back to a most recent checkpoint;
- scanning a system timeline index between the checkpoint and a point specified by the query;
- computing deltas for a most recent application timeline index based on the scanning; and
- constructing the application timeline index using the checkpoint and the computed deltas.

11. A computer program product as in claim 7, wherein the query comprises a multiple time dimensions, and wherein there is a corresponding timeline index for each time dimension.

12. A system comprising:
- at least one application server comprising memory and at least one data processor; and
- at least one database server comprising memory and at least one data processor;
- wherein the at least one database server:
  - receives data comprising a query of data from the at least one application server, the query specifying at least one fact and a system time and an application time for the at least one fact;
  - accesses a bitemporal timeline index to identify data responsive to the query, the bitemporal timeline index comprising:
    - a system timeline index comprising a system time dimension, the system time dimension comprising a system time that indicates when a data object is visible in the temporal database; and
    - an application timeline index comprising an application time dimension, the application time dimension comprising an application time that indicates when the data object is visible to a user;
  - stores updates to at least one of the application timeline index and the system timeline index in a delta store;
  - dynamically generates the application timeline index for a point in time specified by the query by merging the application timeline index with the corresponding delta store;
  - retrieves the identified data; and
  - provides the retrieved data to a remote application server.

13. A system as in claim 12, wherein:
- the bitemporal timeline index comprises a plurality of application timeline indices corresponding to each point in system time; and
- the application timeline index is built dynamically in response to receiving the query by:
  - reverting back to a most recent checkpoint;
  - scanning a system timeline index between the checkpoint and a point specified by the query;
  - computing deltas for a most recent application timeline index based on the scanning; and
  - constructing the application timeline index using the checkpoint and the computed deltas.

* * * * *